(12) United States Patent
Ustiuzhanin et al.

(10) Patent No.: US 12,266,118 B2
(45) Date of Patent: Apr. 1, 2025

(54) DEVICES AND METHODS FOR DIGITAL SIGNAL PROCESSING

(71) Applicant: Huawei Technologies Co., Ltd., Shenzhen (CN)

(72) Inventors: Nikita Vyacheslavovich Ustiuzhanin, Saint Petersburg (RU); Marat Ravilevich Gilmutdinov, Saint Petersburg (RU); Anton Igorevich Veselov, Saint Petersburg (RU); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 17/879,592

(22) Filed: Aug. 2, 2022

(65) Prior Publication Data

US 2022/0383516 A1 Dec. 1, 2022

Related U.S. Application Data

(63) Continuation of application No. PCT/RU2020/000054, filed on Feb. 3, 2020.

(51) Int. Cl.
*G06K 9/00* (2022.01)
*G06T 3/18* (2024.01)
*G06T 7/246* (2017.01)

(52) U.S. Cl.
CPC .............. *G06T 7/248* (2017.01); *G06T 3/18* (2024.01); *G06T 2207/20221* (2013.01); *G06T 2207/30241* (2013.01)

(58) Field of Classification Search
CPC . G06T 7/248; G06T 3/18; G06T 2207/20221; G06T 2207/30241;

(Continued)

(56) References Cited

U.S. PATENT DOCUMENTS

| | | | | |
|---|---|---|---|---|
| 5,642,166 A | * | 6/1997 | Shin ................ | H04N 19/537 375/E7.081 |
| 6,879,731 B2 | * | 4/2005 | Kang ................ | H04N 5/77 386/E5.069 |
| 7,142,600 B1 | * | 11/2006 | Schonfeld ........ | G06T 7/215 375/E7.076 |
| 8,130,840 B2 | * | 3/2012 | Mishima .......... | G06T 3/4007 375/240.16 |

(Continued)

FOREIGN PATENT DOCUMENTS

WO 2013095180 A1 6/2013
WO 2015172235 A1 11/2015

OTHER PUBLICATIONS

Zlokolica et al., "A new non-linear filter for video processing," Proc. 3rd IEEE Benelux Signal Processing Symposium (SPS-2002), Leuven, Belgium, Mar. 21-22, 2002, Total 7 pages (Jan. 2002).

(Continued)

*Primary Examiner* — Shervin K Nakhjavan
(74) *Attorney, Agent, or Firm* — Leydig, Voit & Mayer, Ltd.

(57) ABSTRACT

A method and device for digital signal processing are provided, particularly relating to video image processing. The device obtains image data comprising a plurality of pixels. The image data comprises a plurality of sequentially captured images. The device estimates, for a target image, a set of backward motion vector fields (backward MVFs) based on the target image, and a first set of images captured before the target image. The device further estimates a set of forward MVFs based on the target image and a second set of images captured after the target image. Depending on the estimating for the target image, the device generates an output image based on a merging procedure of the target image and the first set of images and the set of backward MVFs, and/or the second set of images and the set of forward MVFs.

20 Claims, 10 Drawing Sheets

(58) Field of Classification Search
CPC ............. G06T 5/70; G06T 2207/10021; G06T 2207/20216; G06T 5/50
See application file for complete search history.

(56) References Cited

U.S. PATENT DOCUMENTS

| | | | | |
|---|---|---|---|---|
| 8,553,758 | B2* | 10/2013 | Liu | H04N 19/56 375/E7.113 |
| 8,842,730 | B2* | 9/2014 | Zhou | H04N 7/0112 375/240.12 |
| 9,342,873 | B1 | 5/2016 | Barron | |
| 9,781,382 | B2* | 10/2017 | Zhang | H04N 19/567 |
| 10,531,093 | B2* | 1/2020 | Tang | H04N 19/543 |
| 11,350,102 | B2* | 5/2022 | Xu | H04N 19/577 |
| 2004/0001705 | A1 | 1/2004 | Soupliotis et al. | |
| 2004/0252759 | A1* | 12/2004 | John Winder et al. | H04N 19/87 375/E7.251 |
| 2011/0110583 | A1* | 5/2011 | Zhang | G06T 7/579 382/154 |

OTHER PUBLICATIONS

Dabov et al., "Image denoising with block-matching and 3D filtering," Proceedings of SPIE—The International Society for Optical Engineering, vol. 6064, Total 10 pages (Feb. 2006).

Huang et al., "A Multistage Motion Vector Processing Method for Motion-Compensated Frame Interpolation," IEEE Transactions on Image Processing, vol. 17, No. 5, pp. 694-708, Institute of Electrical and Electronics Engineers, New York, New York (May 2008).

Biswas et al., "A Novel Motion Estimation Algorithm Using Phase Plane Correlation for Frame Rate Conversion," Conference Record of the Thirty-Sixth Asilomar Conference on Signals, Systems and Computers, 2002, pp. 492-496, Institute of Electrical and Electronics Engineers, New York, New York (Nov. 3-6, 2002).

Patel et al., "Optical Flow Measurement using Lucas kanade Method," International Journal of Computer Applications (0975-8887), vol. 61, No. 10, pp. 6-10 (Jan. 2013).

Horn et al., "Determining Optical Flow," A. I. Memo 572, Massachusetts Institute of Technology, Artificial Intelligence Laboratory, Published in Other Conferences, Total 28 pages (Apr. 1980).

Zhu et al., "A New Diamond Search Algorithm for Fast Block-Matching Motion Estimation," IEEE Transactions on Image Processing, vol. 9, No. 2, pp. 287-290, Institute of Electrical and Electronics Engineers, New York, New York (Feb. 2000).

Hassen et al., "Block Matching Algorithms for Motion Estimation," 2013 7th IEEE International Conference on e-Learning in Industrial Electronics (ICELIE), pp. 136-139, Institute of Electrical and Electronics Engineers, New York, New York (Nov. 10-13, 2013).

"Stunning color video in near darkness," Hikvision DarkFighter Technology, Total 16 pages (Date before Feb. 3, 2020).

* cited by examiner

DEVICES AND METHODS FOR DIGITAL SIGNAL PROCESSING

CROSS-REFERENCE TO RELATED APPLICATIONS

This application is a continuation of International Application No. PCT/RU2020/000054, filed on Feb. 3, 2020, the disclosure of which is hereby incorporated by reference in its entirety.

TECHNICAL FIELD

Embodiments of the present disclosure generally relate to the field of digital signal processing, and particularly relates to digital image processing, video processing, etc. For example, embodiments of the invention may be provided for (e.g., implemented in) mobile devices, automotive cameras, closed-circuit television cameras, etc. To this end, the present disclosure presents a device that is configured to obtain image data of an image sensor. The image data comprises a plurality of sequentially captured images (e.g., input images). Moreover, the device estimates a set of motion vector fields (MVFs) and generates an output image. For example, the device may perform a motion aware light accumulation procedure on the captured images to generate the output image. A Signal-to-Noise Ratio (SNR) of the image data of the output image may be enhanced.

BACKGROUND

Generally, low SNR is a challenging issue in the Digital Signal Processing (DSP) field. A conventional method for enhancing the SNR of image data obtained from an image sensor is to increase the collecting time. The collecting time is also called exposure time in cameras. With an increase of the exposure time, the image senor is able to accumulate more photons. This operation is called light accumulation. Further, a light accumulation procedure may be done in an analog domain by increasing the exposure time of the camera, or in a digital domain by processing of the image data, using a linear or a non-linear transform.

Conventional devices and methods are known that perform image denoising. For instance, the SNR of image data may be increased based on a block-matching algorithm and using three-dimensional (3D) filtering. Further, in some other conventional devices and methods to perform image denoising for video processing, a non-linear filter is applied and the SNR of image data may be increased.

However, certain adverse issues arise from conventional devices and methods. As an example, some parts of objects in a frame may become indistinguishable. Moreover, conventional devices and methods have problems with data limitation since they work only with limited frames (e.g., one frame is used for image denoising).

SUMMARY

In view of the above-mentioned adverse issues, embodiments of the present invention aim to improve the conventional devices and methods. An objective is to provide a device and a method for digital signal processing (e.g., for video processing), which can perform an improved light accumulation procedure on obtained image data. For example, the obtained image data may be captured images with low SNR (e.g., obtained in low light condition). The device and the method should enhance the captured images and should increase the SNR. Further, the variance of noise should be decreased. Generally, the quality of the generated output image should be improved. For instance, motion objects' blurring, oversaturated areas (i.e., empty white areas), and indistinguishable parts of the image should be reduced.

The objective is achieved by the embodiments of the invention as described in the enclosed independent claims. Advantageous implementations of the embodiments of the invention are further defined in the dependent claims.

A first aspect of the present disclosure provides a device for digital signal processing, the device being configured to obtain image data, of an image sensor comprising a plurality of pixels, wherein the image data comprises a plurality of sequentially captured images, estimate, for a target image, a set of backward motion vector fields (backward MVFs) based on the target image and a first set of images captured before the target image, and/or a set of forward MVFs based on the target image and a second set of images captured after the target image, and depending on the estimating for the target image, generate an output image based on performing a merging procedure of the target image and the first set of images and the set of backward MVFs, and/or the second set of images and the set of forward MVFs.

The device is able to perform an improved light accumulation procedure on obtained image data. For example, the obtained image data may be captured images with low SNR, and the device can enhance the SNR. Noise is particularly decreased. Generally, the quality of the generated output image is improved.

The device may be, or may be incorporated in, an electronic device, a digital camera, a video camera, a closed-circuit television (CCTV) camera, an automotive camera, a system-on-chip (SoC) or in a software, a mobile phone, a smartphone, an augmented reality device, a virtual reality device, an Image Signal Processing (ISP) module of an imaging device, a part of an optical flow generation for an ISP of an imaging device, a camera module of a high dynamic range imaging device, etc. The device may also be implemented at the camera side (at the output of image sensor) or the (e.g., output of the) ISP pipeline, or it may be used as temporal de-noiser or a light accumulator, etc.

The image sensor may be any image sensor, for example, it may be a Charge-Coupled Device (CCD) image sensor, a Complementary Metal-Oxide Semiconductor (CMOS), etc.

The device obtains the image data, wherein the images may be any type of image, for example, the images may be image frames, sub-frames, sub-images, pictures, subpictures, etc.

According to some embodiments, the device may estimate, for a target image, a set of backward MVFs based on the target image and a first set of images captured before the target image.

For instance, the device may use a motion estimation algorithm for determining matching areas in neighbor frames. Then the samples along motion trajectory may be processed (e.g., non-linearly) to reduce noise intensity and adjust the contrast, simultaneously.

The device of the first aspect may perform a Motion Aware Light Accumulation (MALA) procedure and may reduce motion objects' blurring. In the following, the terms "performing a merging procedure for generating the output image" and the "performing the motion aware light accumulation procedure" are used interchangeably.

According to some embodiments, the device may estimate, for a target image, a set of forward MVFs based on the target image and a second set of images captured after the target image.

According to some embodiments, the device may estimate, for a target image, a set of backward MVFs based on the target image and a first set of images captured before the target image and a set of forward MVFs based on the target image and a second set of images captured after the target image.

Moreover, the device, depending on the estimating for the target image, generates the output image. For example, the device estimates the target image, and afterwards, depending on (i.e., the result of) the estimating for the target image, it may generate the output image. In other words, the generation step may be specifically based on the type (s) of image sets and MVFs which have been estimated in the estimation step.

According to some embodiments, depending on the estimating for the target image, the device may generate an output image based on performing a merging procedure of the target image and the first set of images and the set of backward MVFs.

According to some embodiments, depending on the estimating for the target image, the device may generate an output image based on performing a merging procedure of the target image and the second set of images and the set of forward MVFs.

According to some embodiments, depending on the estimating for the target image, the device may generate an output image based on performing a merging procedure of the target image and the first set of images and the set of backward MVFs, and the second set of images and the set of forward MVFs.

For example, the image data may be captured such that a light accumulation in the analog domain (increasing exposure time) is performed. However, when performing a light accumulation in the analog domain, the moving objects may be blurred since the analog systems cannot compensate the motion. The device may obtain the image data and (e.g., from the image sensor or after ISP pipeline). Furthermore, without limiting the present disclosure, the device may use one frame (called target) and several of their neighbors for performing the light accumulation.

In particular, the first MVF and/or the second MVF are estimated based on one or more of:
  a Block-matching motion estimation procedure,
  a Phase plane correlation procedure,
  an optical flow process in particular, Lucas-Kanade, Horn-Shunk.

In an implementation form of the first aspect, for performing the merging procedure, the device is further configured to depending on the estimating for the target image, estimate a set of backward warped images based on a first warping of the first set of images and the set of backward MVFs, and/or estimate a set of forward warped images based on a second warping of the second set of images and the set of forward MVFs; and depending on the estimating for the target image, generate the output image by combining the target image with the set of backward warped images and/or the set of forward warped images.

According to some embodiments, for performing the merging procedure, the device is further configured to, depending on the estimating for the target image, estimate a set of backward warped images based on a first warping of the first set of images and the set of backward MVFs, and depending on the estimating for the target image, generate the output image by combining the target image with the set of backward warped images.

According to some embodiments, for performing the merging procedure, the device is further configured to, depending on the estimating for the target image, estimate a set of forward warped images based on a second warping of the second set of images and the set of forward MVFs; and depending on the estimating for the target image, generate the output image by combining the target image with the set of forward warped images.

According to some embodiments, for performing the merging procedure, the device is further configured to, depending on the estimating for the target image, estimate a set of backward warped images based on a first warping of the first set of images and the set of backward MVFs, and estimate a set of forward warped images based on a second warping of the second set of images and the set of forward MVFs; and depending on the estimating for the target image, generate the output image by combining the target image with the set of backward warped images and the set of forward warped images.

The warping (e.g., estimating a backward warped image and/or forward warped image) may be a reconstruction of one frame from another frame using MVFs between these frames. For example, the device may compensate movements between the target frame and the neighbor frames with a motion estimation approach and then accumulate data from the warped frames. The present disclosure is not limited to a specific number of frames, for example, the device may use three or more frames. Moreover, in the following, two adjacent neighbor frames are used as a simple way of hardware implementation, without limiting the present disclosures to the number of used neighbor frames.

In a further implementation form of the first aspect, the device is further configured to apply a filtration process to the output image generated by the merging procedure.

In a further implementation form of the first aspect, estimating the set of backward MVFs comprises estimating a motion of an object and/or a motion of the image sensor and/or a motion shift in an image obtained after an ISP pipeline, between the target image and the first set of images.

In a further implementation form of the first aspect, estimating the set of forward MVFs comprises estimating a motion of an object and/or a motion of the image sensor and/or a motion shift in an image obtained after an ISP pipeline, between the target image and the second set of images.

In a further implementation form of the first aspect, each backward MVF of the set of backward MVFs is estimated based on exactly one image of the first set of images, and/or each forward MVF of the set of forward MVFs is estimated based on exactly one image of the second set of images.

In a further implementation form of the first aspect, the exactly one image of the first set of images on which each backward motion field is estimated based on, is different for each of the backward MVFs, and/or the exactly one image of the second set of images on which each MVF is estimated based on, is different for each of the forward MVFs.

In a further implementation form of the first aspect, the device is further configured to select at least one pixel in the target image and its corresponding pixels in the first set of images and/or the second set of images, and calculate a motion shift between the at least one pixel and at least one selected corresponding pixel, for estimating the set of backward MVFs and/or the set of forward MVFs.

In a further implementation form of the first aspect, calculating the motion shift comprises determining one or more motion trajectories for one or more coordinates, and performing a non-linear transformation on the determined one or more motion trajectories for reducing noise intensity and/or adjusting contrast.

In a further implementation form of the first aspect, the merging procedure is adapted to be performed pixelwise.

In a further implementation form of the first aspect, the pixelwise merging procedure further comprises a weighted or unweighted addition of intensity values of the target frame and intensity values of the first set of images and/or the second set of images.

In a further implementation form of the first aspect, the obtained image data and the generated output image are based on a Bayer array, YUV color spacer, or RGB color spacer.

In particular, various image data may be used, for example, the device may be based on a pre-processor that is implemented before ISP pipeline for a Bayer array, or a post-processor that is implemented after ISP pipeline for an RGB color spacer or YUV color spacer.

In a further implementation form of the first aspect, the merging procedure is performed separately on each color component.

A second aspect of the present disclosure provides a method for digital signal processing, the method comprising obtaining image data of an image sensor comprising a plurality of pixels, wherein the image data comprises a plurality of sequentially captured images, estimating, for a target image, a set of backward MVFs based on the target image and a first set of images captured before the target image, and/or a set of forward MVFs based on the target image and a second set of images captured after the target image, and depending on the estimating for the target image, generating an output image based on performing a merging procedure of the target image and the first set of images and the set of backward MVFs, and/or the second set of images and the set of forward MVFs.

In an implementation form of the second aspect, for performing the merging procedure, the method further comprises, depending on the estimating for the target image, estimating a set of backward warped images based on a first warping of the first set of images and the set of backward MVFs, and/or estimating a set of forward warped images based on a second warping of the second set of images and the set of forward MVFs; and depending on the estimating for the target image, generating the output image by combining the target image with the set of backward warped images and/or the set of forward warped images.

In a further implementation form of the second aspect, the method further comprises applying a filtration process to the output image generated by the merging procedure.

In a further implementation form of the second aspect, estimating the set of backward MVFs comprises estimating a motion of an object and/or a motion of the image sensor and/or a motion shift in an image obtained after an ISP pipeline, between the target image and the first set of images.

In a further implementation form of the second aspect, estimating the set of forward MVFs comprises estimating a motion of an object and/or a motion of the image sensor and/or a motion shift in an image obtained after an ISP pipeline, between the target image and the second set of images.

In a further implementation form of the second aspect, each backward MVF of the set of backward MVFs is estimated based on exactly one image of the first set of images, and/or each forward MVF of the set of forward MVFs is estimated based on exactly one image of the second set of images.

In a further implementation form of the second aspect, the exactly one image of the first set of images on which each backward motion field is estimated based on, is different for each of the backward MVFs, and/or the exactly one image of the second set of images on which each forward motion field is estimated based on, is different for each of the forward MVFs.

In a further implementation form of the second aspect, the method further comprises selecting at least one pixel in the target image and its corresponding pixels in the first set of images and/or the second set of images, and calculating a motion shift between the at least one pixel and at least one selected corresponding pixel, for estimating the set of backward MVFs and/or the set of forward MVFs.

In a further implementation form of the second aspect, calculating the motion shift comprises determining one or more motion trajectories for one or more coordinates, and performing a non-linear transformation on the determined one or more motion trajectories for reducing noise intensity and/or adjusting contrast.

In a further implementation form of the second aspect, merging procedure is adapted to be performed pixelwise.

In a further implementation form of the second aspect, the pixelwise merging procedure further comprises a weighted or unweighted addition of intensity values of the target frame and intensity values of the first set of images and/or the second set of images.

In a further implementation form of the second aspect, the obtained image data and the generated output image are based on a Bayer array, YUV color spacer, or RGB color spacer.

In a further implementation form of the second aspect, the merging procedure is performed separately on each color component.

In a further implementation form of the second aspect, the merging procedure is performed separately on each color component.

In a further implementation form of the second aspect, the method is executed by means of a device according to the first aspect and/or one of the implementation form of the first aspect.

A third aspect of the present disclosure provides a computer program comprising a program code for performing the method according to the second aspect or any of its implementation forms.

A fourth aspect of the present disclosure provides a non-transitory storage medium storing executable program code which, when executed by a processor, causes the method according to the second aspect or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
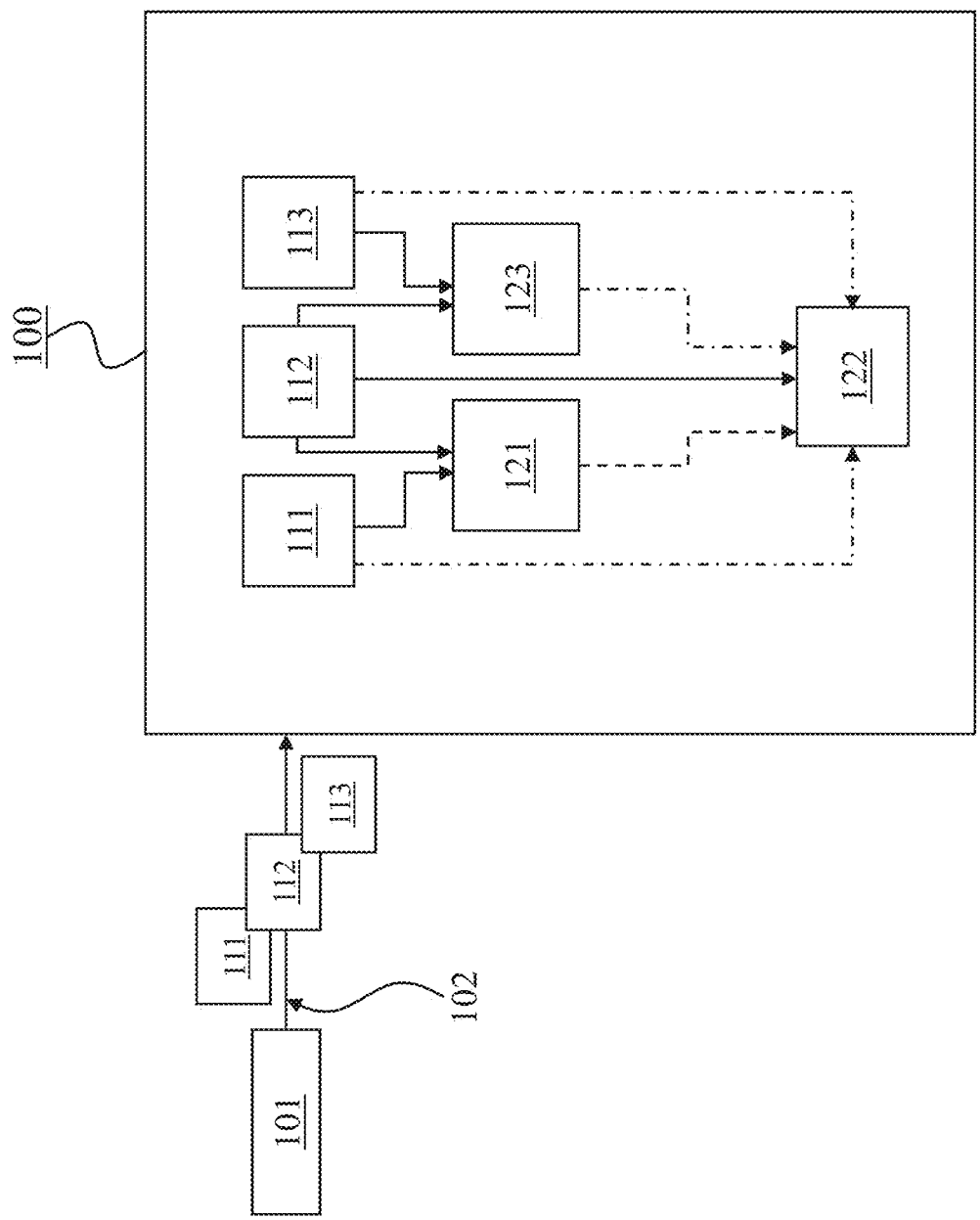
FIG. 1 shows a device for digital signal processing, according to an embodiment of the invention.

FIG. 1 shows a device 100 for digital signal processing, according to an embodiment of the invention.

The device 100 for digital signal processing may be, or may be incorporated in, an electronic device, a digital camera, a video camera, an ISP module of an imaging device, etc.

The device 100 is configured to obtain image data 102, of an image sensor 101 comprising a plurality of pixels. The image data 102 comprises a plurality of sequentially captured images 111, 112, 113.

The device 100 is further configured to estimate, for a target image 112, a set of backward MVFs 121 based on the target image 112 and a first set of images 111 captured before the target image 112, and/or a set of forward MVFs 123 based on the target image 112 and a second set of images 113 captured after the target image 112.

The device 100 is further configured to, depending on the estimating for the target image 112, generate an output image 122 based on performing a merging procedure of the target image 112 and the first set of images 111 and the set of backward MVFs 121, and/or the second set of images 113 and the set of forward MVFs 123.

The device 100 may comprise a processing circuitry (not shown in FIG. 1) configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

Figure 2:
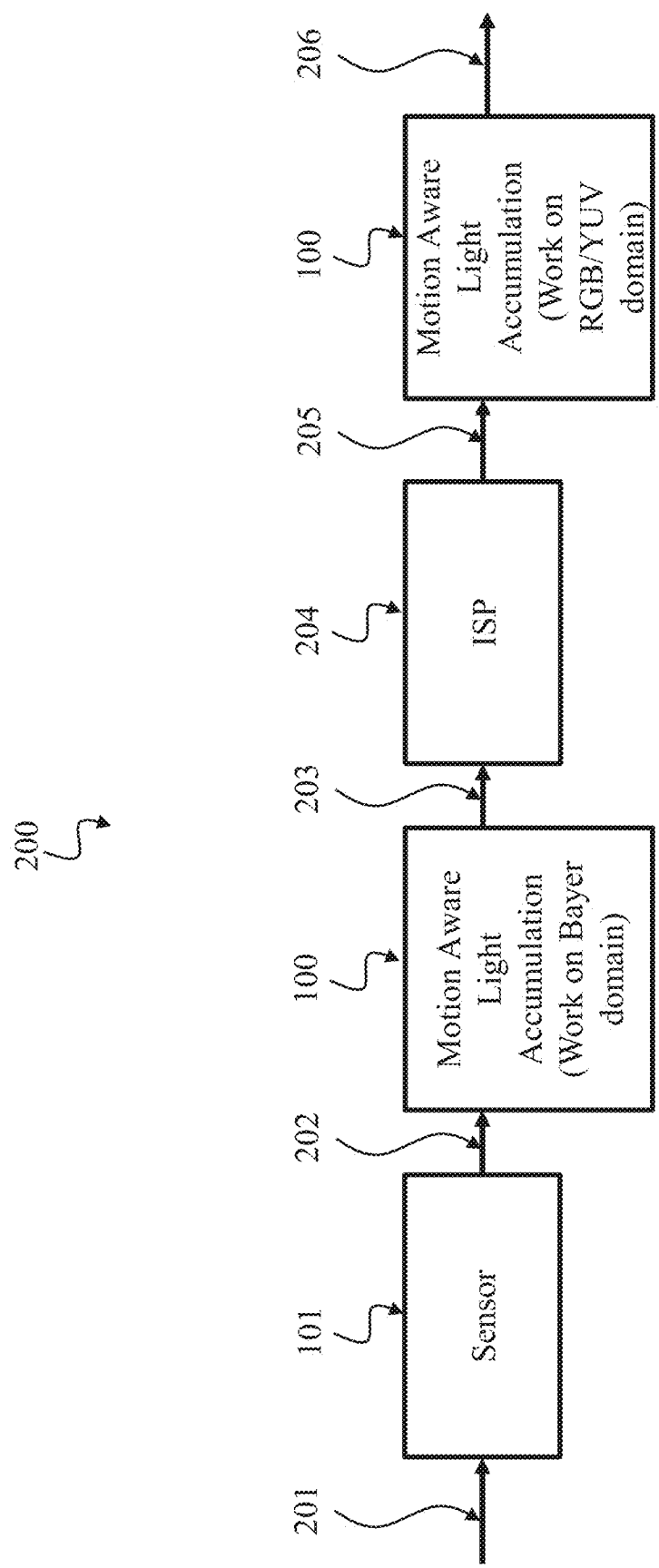
FIG. 2 shows the device performing a motion aware light accumulation procedure.

FIG. 2 shows a schematic view of a diagram 200 illustrating the device 100 performing a motion aware light accumulation procedure.

The motion aware light accumulation procedure may be or may comprise generating the output image 122 (e.g., generating the output image 122 based on performing a merging procedure of the target image 112 and the first set of images 111 and the set of backward MVFs 121, and/or the second set of images 113 and the set of forward MVFs 123).

The diagram 200 depicted in FIG. 2 shows a pipeline comprising the device 100. The device 100 may be implemented as a pre-processor before the ISP 204 and/or as a post-processor after the ISP 204. For instance, the device 100 may be implemented between the image sensor 101 and the ISP 204 (e.g., it works on Bayer domain as a pre-processor) and/or it may be after the ISP 204 (e.g., it works on YUV or RGB domains as a post-processor). Moreover, the detailed description is presented exemplarily based on using three frames, however, the present discourse is not limited in numbers of input frames.

In FIG. 2, the input optical flow is indicated with reference 201. The image sensor 101 provides raw frames 202 (e.g., the image data 102 comprises the raw frames 202). The device 100 obtains the raw frames 202, performs the motion aware light accumulation procedure on the Bayer domain and enhances the raw frames 202. The enhanced frames 203 may be provided to the ISP 204. The device 100 may also generate the output image 122 (not shown in FIG. 2), etc.

Moreover, in some embodiments, the output of the ISP 205 (for example, raw frames or enhanced frames) may be provided to the device 100 which may be located after the ISP 204. Furthermore, the device 100 may perform the motion aware light accumulation procedure on the RGB/YUV domains and enhance the raw frames. The enhanced frames 206 may further be provided and/or the device 100 may generate the output image 122 (not shown in FIG. 2).

Figure 3:
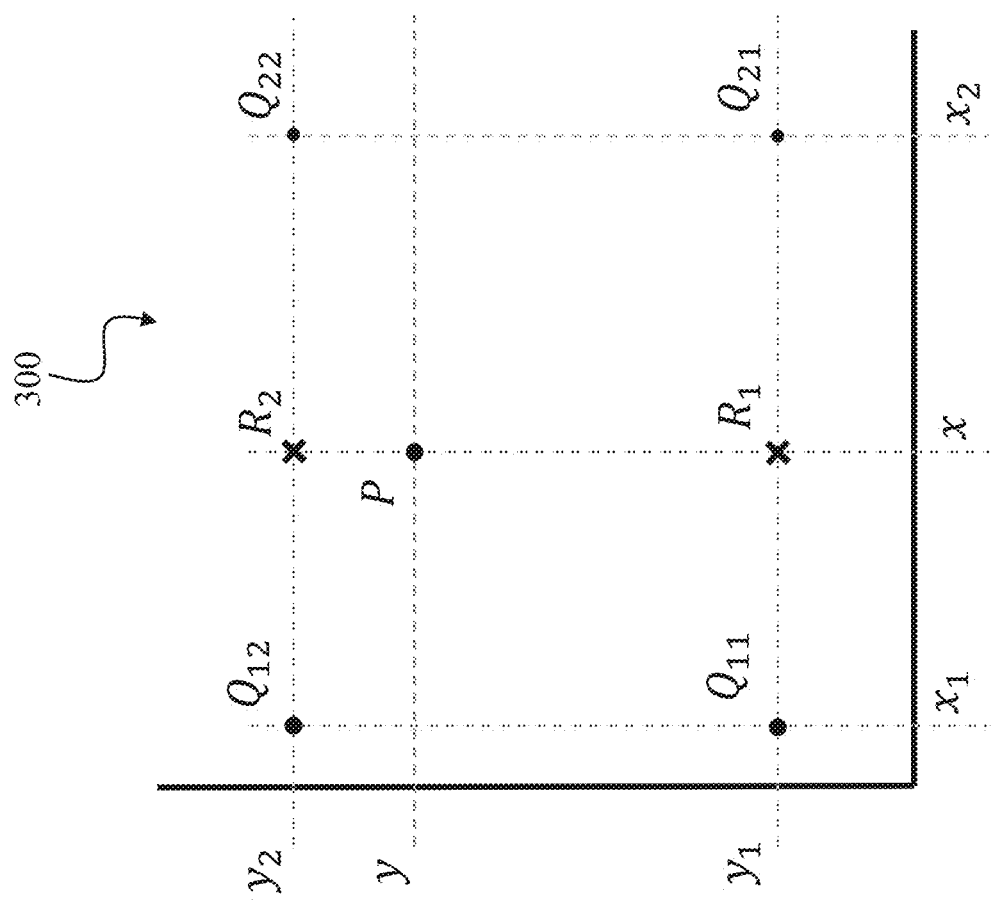
FIG. 3 is a diagram illustrating performing a linear interpolation.

FIG. 3 is a diagram 300 illustrating performing a linear interpolation. For example, the device 100 may perform a motion estimation (i.e., estimate the set of backward MVFs 121 and/or the set of forward MVFs 123) based on performing such a linear interpolation.

At first, the device 100 may estimate the motion of objects and camera motion between the target image 112 (current frame) and the first image 111 (previous frame). The device 100 may also estimate the motion of objects and camera motion between the target image 112 (current frame) and the second image 113 (next frame). For example, the device 100 estimates the backward MVF 121 and/or the forward MVF 123.

Motion estimation may be done (i.e., the backward MVF 121 and/or the forward MVF 123 may be estimated) by using one of the following methods:
Block-matching motion estimation;
Phase plane correlation;
Optical flow (Lucas-Kanade, Horn-Shunk).

Further, the device 100 may calculate shift ($\Delta x; \Delta y$) between pixels in frame t (target image 112) and corresponding pixels in frame t+k (e.g, second image 113). The coordinates of shifting are called motion vector. The output of motion estimation is set of motion vectors per each sample which called MVF. For simplicity reasons the MVFs may be grouped for several samples, for example, the MVFs may be block-wise (i.e., using square blocks, e.g. of 2×2, 4×4 pixels or any other number of pixels, rectangular blocks, e.g., of 1×2, 2×4 or any other number of pixels in vertical or horizontal orientation, or blocks of any other size or form) or pixel-wise. Furthermore, the pixel-wise MVF may be used without any changes. Block-wise MVF may be cast to pixel-wise before using. This may be done in various ways (repeating or interpolation algorithm such as bilinear or so on).

The device 100 may also select the format of motion vectors which may be integer or non-integer (float-point) MVs. Motion vectors in integer domain may provide less accuracy but it has less calculation and complexity.

Moreover, warping in float-point domain may require additional operations such as interpolation (bilinear, bicubic, etc. In the following, the device 100 performs a bilinear interpolation (depicted in FIG. 3).

The bilinear interpolation is calculated according to Eq. (1) as follow:

$$P = \frac{y_2 - y}{y_2 - y_1} R_1 + \frac{y - y_1}{y_2 - y_1} R_2, \quad \text{Eq. (1)}$$

where, $$R_1 = \frac{x_2 - x}{x_2 - x_1} Q_{11} + \frac{x - x_1}{x_2 - x_1} Q_{21}, \quad \text{Eq. (2)}$$

and $$R_2 = \frac{x_2 - x}{x_2 - x_1} Q_{12} + \frac{x - x_1}{x_2 - x_1} Q_{22}$$

where, P is target point, $Q_{11}(x_1, y_1)$, $Q_{12}(x_1, y_2)Q_{21}(x_2, y_1)$, $Q_{22}(x_2, y_2)$ are surrounding points, $R_1$ and $R_2$ are auxiliary points.

Figure 4:
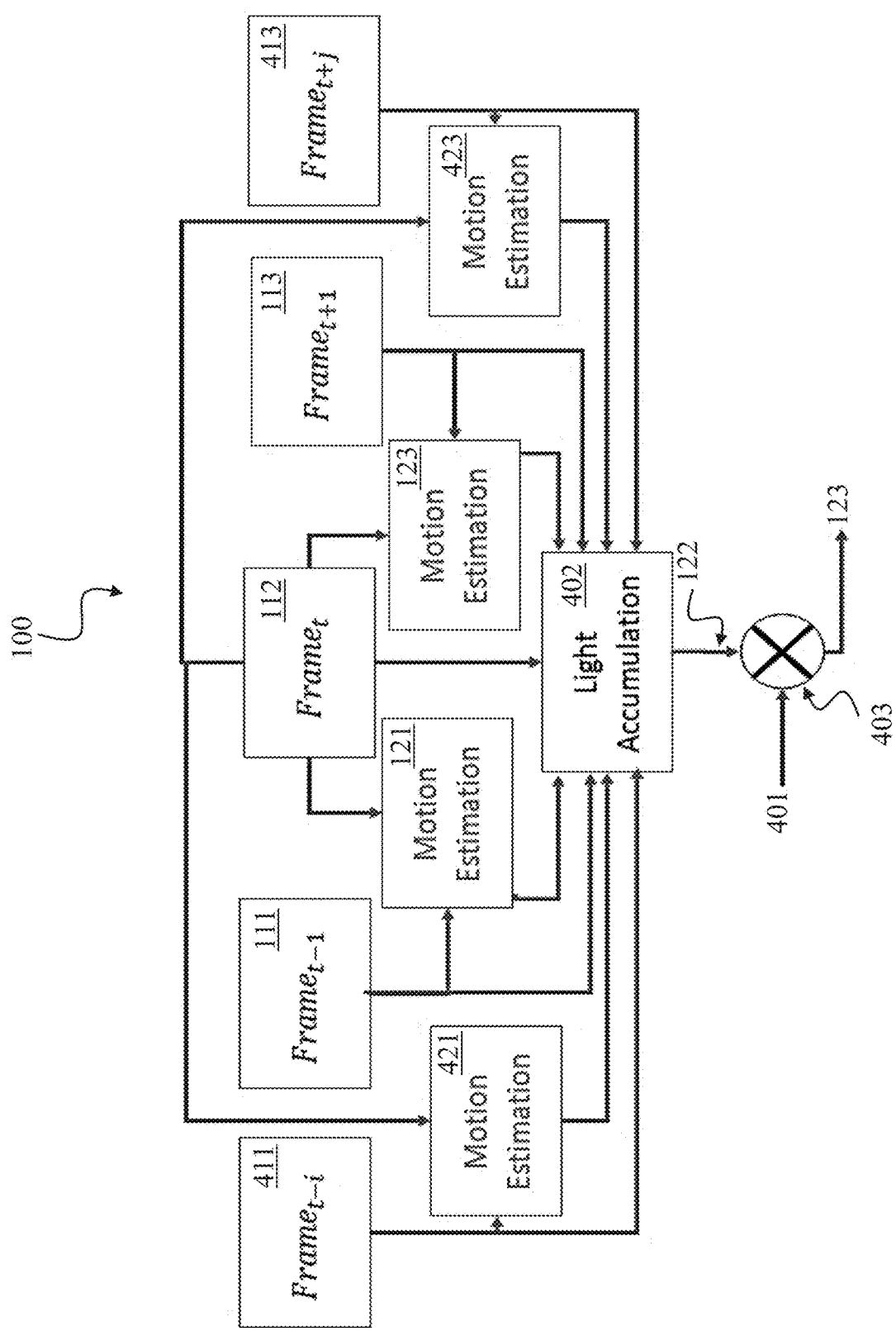
FIG. 4 depicts a schematic view of the device generating the output image based on a set of backward MVFs and a set of forward MVFs.

Reference is made to FIG. 4 which is a schematic view of an example of the device 100 generating the output image 122 based on a set of backward MVFs 121, 421 and a set of forward MVFs 123, 423.

The device 100 obtains image data 102. The image data 102 comprises a plurality of sequentially captured images including the target image 112 (Frame$_t$ that is a RAW frame with number t), the first set of images 111 (Frame$_{t-1}$ that is a RAW frame with number t−1), 411 (Frame$_{t-i}$ that is a RAW frame with number t−i), and the second set of images 113 (Frame$_{t+1}$ that is a RAW frame with number t+1) and 413 (Frame$_{t+j}$ that is a RAW frame with number t+j).

The device 100 further estimates a set of backward MVFs 121 (for example, the motion estimation unit indicated with references 121 estimates the MVF between frames t and t−1), 421 (for example, the motion estimation unit indicated with references 421 estimates the MVF between frames t and t−i).

The device 100 further estimates a set of forward MVFs 123 (for example, the motion estimation unit indicated with references 123 estimates the MVF between frames t and t+1), 423 (for example, the motion estimation unit indicated with references 423 estimates the MVF between frames t and t+j).

Any motion estimation approach may be used for estimating the MVF. These MVF can be block-based or pixel-wise. In case of block-based MVF, the device 100 may interpolate it to pixel-wise size. Further, the weight for accumulation may be equal to 1, and for temporal de-noising may be 1/n, where n is the number of accumulated frames.

The obtained MVFs estimated between the current frame (the target image 112) and the previous frame (the first set of images 111, 411) and current frame (the target image 112) and between current and next frame (the second set of images 113, 413) and also frames 111, 411, 113, and 413 are used for generating the output image 122 based on performing a merging procedure (for example, performed by the light accumulation unit 402). After the merging procedure, the generated output image 122 (accumulated frame) may further be filtered, for example, the device 100 may apply a filtration process. For example, the filtering unit 403 may obtain an enhanced coefficient for filtration 401 and apply the filtration process on the output image 122 in order to receive the resulting frame 123.

The merging procedure (for example, performed by the light accumulation unit 402) may be used in different domains.

In some embodiments, the merging procedure may be performed in Bayer domain. For example, the input frames in Bayer domain have size W×H, where W is width and H is height. The input MVFs have size $$\left(\frac{W}{2}\right) \times \left(\frac{H}{2}\right)$$

because color components in Bayer domain have size $$\left(\frac{W}{2}\right) \times \left(\frac{H}{2}\right)$$

with shifting by one pixel (mosaic structure, Bayer pattern). These components may be split in separate arrays before the light accumulation and merged after. The light accumulation may be applied to corresponded components according to Eq. (3) as follow:

$$\text{LightAccumulation}(I_{t-k}^{x,y} \ldots I_t^{x,y} \ldots I_{t=l}^{x,y}, \\ MV_{t,(t-k)}^{x,y} \ldots MV_{t,(t+l)}^{x,y}), \quad \text{Eq. (3)}$$

where, I is the color component (R, $G_1$, $G_2$ or B), the (x, y) are coordinates of pixel, t is the number of frame, and l, k are frame positions. In a common way, the $MV_{t,(t-k)}^{x,y}$ is list of MVF for each of Bayer components (due to spatial pixel shifting in Bayer pattern). However, the number of used MVF in such list can be decreased to one to reduce calculation complexity.

In some embodiments, the merging procedure may be performed in RGB and YUV domains. The light Accumulation in RGB and YUV domains requires frames with size W×H and MVF with size W×H. Frames in YUV and RGB domains are already split that is why it is not needed to pre-process frames before Light Accumulation. Moreover, the light accumulation procedure in RGB and YUV domains works is equal to Bayer domain, but with another color components. For instance, the light accumulation may be applied to corresponded components according to Eq. (4) as follow:

$$\text{LightAccumulation}(I_{t-k}^{x,y} \ldots I_t^{x,y} \ldots I_{t=l}^{x,y}, \\ MV_{t,(t-k)}^{x,y} \ldots MV_{t,(t+l)}^{x,y}), \quad \text{Eq. (4)}$$

where, I is the color component (R, G, B or Y, U, V), (x, y) are the coordinates of pixel, t is number of frame, and l, k are frame positions. Moreover, the $MV_{t,(t-k)}^{x,y}$ is MVF is used for all components. The (R, G, B or Y, U, V) components may be aligned in spatial domain (in comparison with Bayer pattern).

Figure 5:
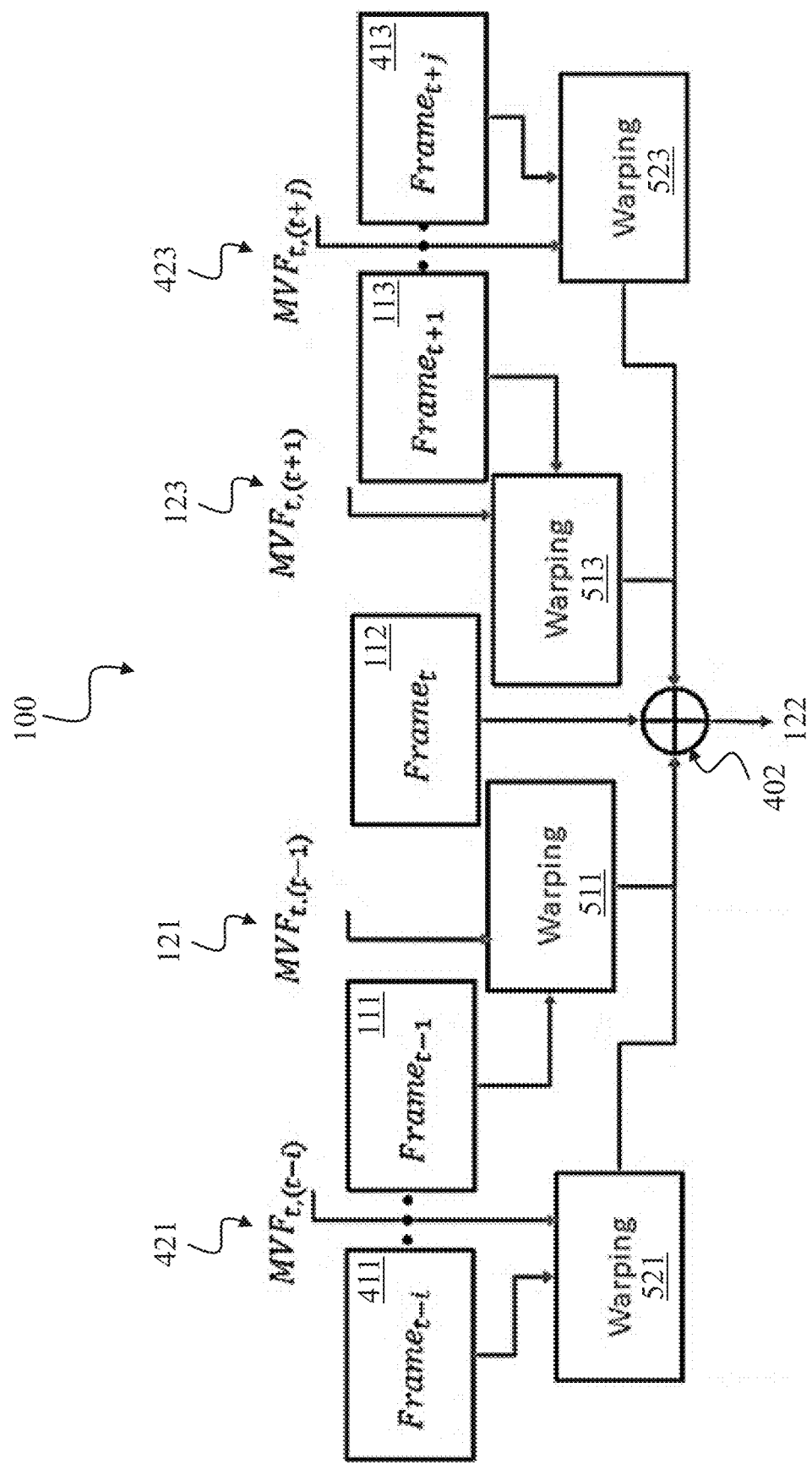
FIG. 5 depicts a schematic view of the device generating the output image based on a set of backward warped images and a set of forward warped images.

Now, reference is made to FIG. 5 which is a schematic view of the device 100 generating the output image 122 based on a set of backward warped images 511, 521 and a set of forward warped images 513, 523.

As it can be derived from FIG. 5, the obtained MVFs 121, 421, 123, 423 are used for estimating the backward and forward warped images.

For example, the devices 100 estimates the backward warped images 511, 521 based on a first warping of the first set of images 111, 411 and the set of backward MVFs 121, 421. Further, the devices 100 estimates the forward warped images 513, 523 based on a second warping of the second set of images 113, 413 and the set of forward MVFs 123, 423.

Moreover, the device 100 generates the output image 122 by combining the target image 112 with the estimated backward warped images 511, 521 and the estimated forward warped images 513, 523. For example, the combining may be performed by the light accumulation unit 402 and the output image 122 may be generated.

The merging procedure (e.g., the light accumulating procedure) may estimate the values of the pixels. For instance, each value of a pixel on coordinates (n, m) may be calculated using the Eq. (5) for the light accumulation as follows:

$$\text{Light Accumulation}(I_{t-k}^{x,y} \ldots I_t^{x,y} \ldots I_{t+l}^{x,y}, \quad \text{Eq. (5)}$$
$$MV_{t,(t-k)}^{x,y} \ldots MV_{t,(t+l)}^{x,y}, n, m) = \omega_0(I_t^{x,y}, \varepsilon_t) +$$
$$\sum_{i=-k}^{-1} \omega_i(I_{t+i}^{x,y}, \varepsilon_{t+i}) \text{Warping}(I_{t+i}^{x,y}, MV_{t,(t+i)}^{x,y}, n, m) +$$
$$\sum_{j=1}^{l} \omega_j(I_{t+j}^{x,y}, \varepsilon_{t+j}) \text{Warping}(I_{t+j}^{x,y}, MV_{t,(t+j)}^{x,y}, n, m),$$

where, the warping of $(I_{t+z}^{x,y}, MV_{t,(t+z)}^{x,y}, n, m)$ may be obtained according to Eq. (6) as follows:

$$\text{Warping}(I_{t+k}^{x,y}, MV_{t,(t+k)}^{x,y}, n, m) = I_{t+k}^{x,y}[n+MV_{t,(t+k)}^{x}; m+MV_{t,(t+k)}^{y}], \quad \text{Eq. (6)}$$

where, z=[k; −1], [1, 1], n=[0, Width−1], and m=[0, Height−1], I is color component (R, G, B or Y, U, V), the (x, y) are coordinates of pixel, t is the number of frame, and l, k are frame positions.

Moreover, the argument $\tilde{I}_z^{x,y}$ of none-linear transformation may be obtained from input pixel intensities $I_z^{x,y}$ by removal of outliers. Further, the non-linear process of outliers removal may be described according to Eq. (7) as follows:

$$\tilde{I}_t^{x,y} = \begin{cases} \text{if diff} > Th \text{ then } f(I_z^{x,y}), \\ \text{else } I_z^{x,y} \end{cases} \quad \text{Eq. (7)}$$

Here diff denotes the maximum absolute difference of current sample magnitude $I_z^{x,y}$ from magnitudes of spatial and temporal neighboring samples in area $\Omega$ having the size of $M_{hor} \times M_{vert} \times M_{temp}$, and it may be obtained according to Eq. (8) as follows:

$$\text{diff} = \min_{x',y',z' \in \Omega} |I_z^{x,y} - I_{z'}^{x',y'}| \quad \text{Eq. (8)}$$

where, $$x', y', z' \in \Omega \to |x - x'| < M_{hor} \& |y - y'| < M_{vert} \& |z - z'| < M_{temp}; \quad \text{Eq. (9)}$$

Figure 6:
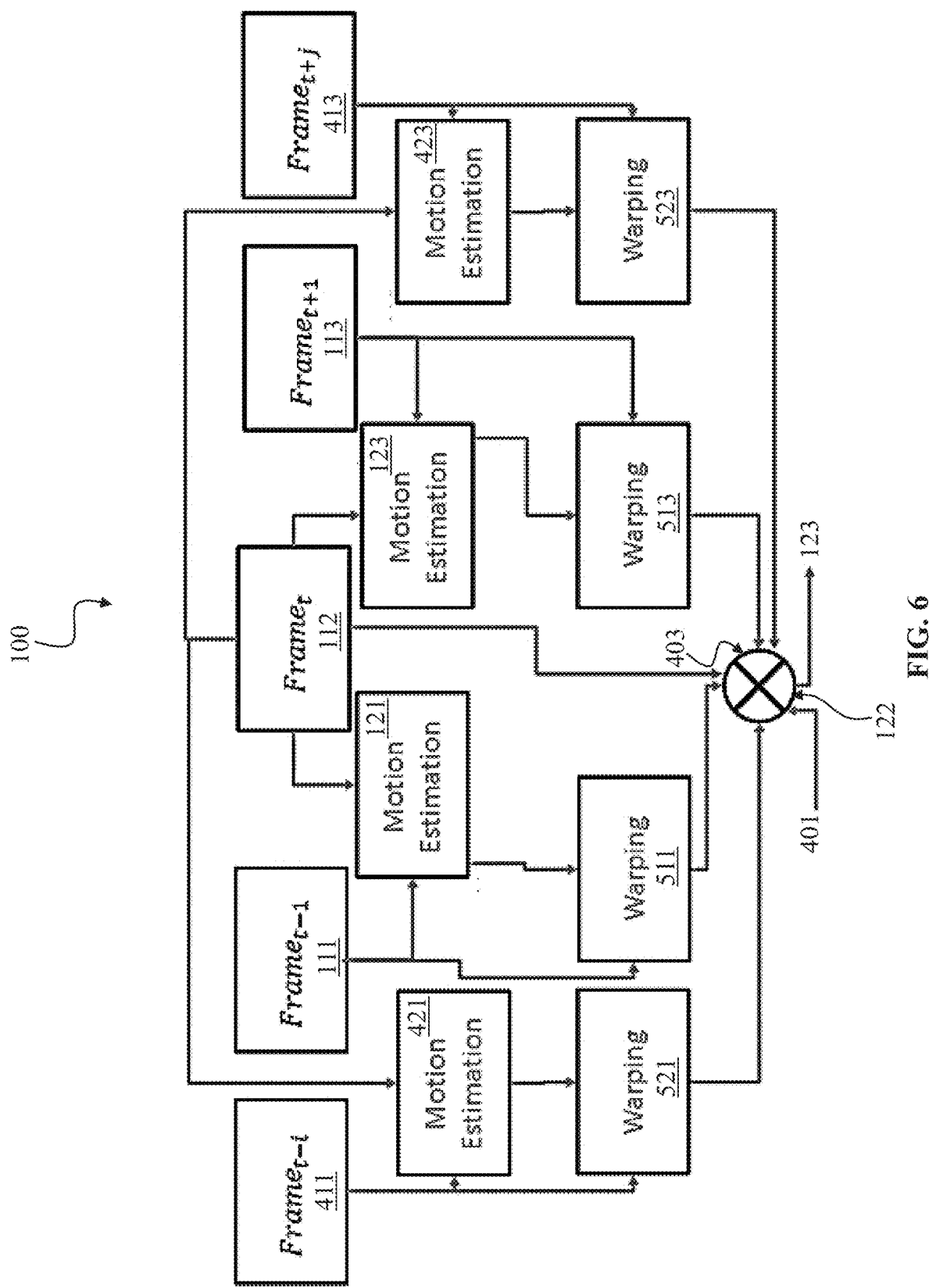
FIG. 6 depicts a schematic view of the device generating the output image based on a set of backward warped images and a set of forward warped images and applying a filtration process to the output image.

Now, reference is made to FIG. 6 which is a schematic view of the device 100 generating the output image 122 based on a set of backward warped images 511, 521 and a set of forward warped images 513, 523 and applying a filtration process to the output image 122.

As it can be derived from FIG. 6, the obtained MVFs 121, 421, 123, 423 are used for estimating the backward 511, 521 and forward warped images 513, 523. Moreover, the backward warped images 511, 521 and the forward warped images 513, 523 and also the target frame 112 are used for generating the output image 122. The generated output image 122 may further be filtered. For example, the filtering unit 403 may obtain the enhanced coefficient for filtration 401 and apply the filtration process on the output image 122 in order to receive the resulting frame 123.

For instance, the filter $f(I_z^{x,y})$ may substitute the $I_z^{x,y}$ by an average value in area $\Omega$, and it may be calculated as a mean value according to Eq. (10) as follows:

$$f(I_z^{x,y}) = \frac{1}{M_{hor} \times M_{vert} \times M_{temp}} \sum_{x',y',z' \in \Omega} I_{z'}^{x',y'} \quad \text{Eq. (10)}$$

or its median value may be obtained according to Eq. (11) as follows:

$$f(I_z^{x,y}) = \text{median}_{x',y',z' \in \Omega}(I_z^{x',y'}) \quad \text{Eq. (11)}$$

For example, the median filtration values may be ordered in descending order, and further, a middle value may be selected. For example, the device 100 obtains the manifold of the $\{I_z^{x',y'}\}$ which is $\{10,1,9,8,2,7,3,4,6\}$ (including 9 elements). Then, the device 100 arranges the elements in descending order and obtains $\{1,2,3,4,6,7,8,9,10\}$. The device 100 further obtains the center (5th position) element which is 6, so the median of $\{10,1,9,8,2,7,3,4,6\}=6$.

Transformation Eq. (7) is relatively non-linear, in order to input the $I_z^{x',y'}$.

In some embodiments, the addition (e.g., per pixel) of the intensity value of the target frame and the corresponding reconstructed values of the neighbor frames obtained by ME and Warping may lead to saturation. Moreover, a weighting may be applied in order to compensate that.

Moreover, the weights in Eq. (5) maybe dependent on:
1) On $\varepsilon_{t'}$, exposure time of frame t'. Typically frames with longer exposure contain motion blur so less reliable, also they have a higher intensity of the signal, so their weight is lower.
2) On $\tilde{I}_t^{x,y}$ filtered intensity. It may allow adjustment for picture brightness and contrast. For instance, selection of $\omega(I)$ non-linearly depending on aggregated histogram of I (depicted on FIG. 7) results in amplification contrast for values I more frequently appearing in input signal.

Figure 7:
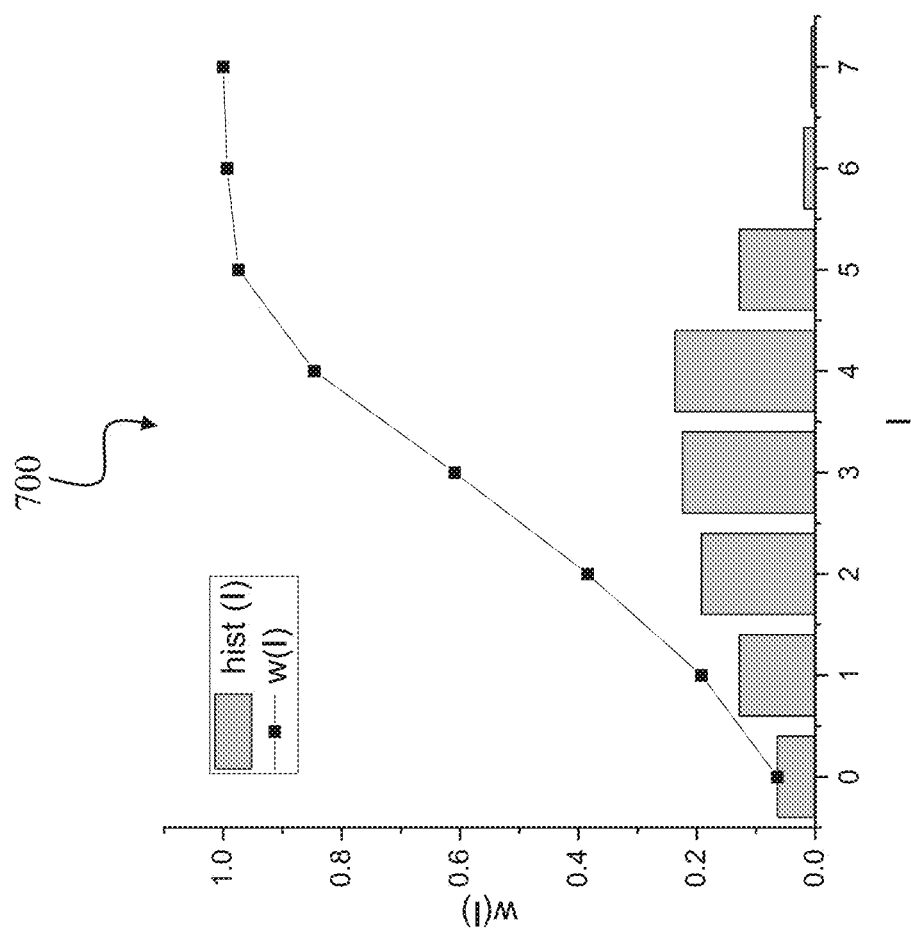
FIG. 7 shows a diagram illustrating the selection of ω(I) and its non-linearly dependency to the aggregated histogram of I.

FIG. 7 shows a diagram 700 illustrating the device 100 selecting $\omega(I)$ such that it has a non-linearly dependency on the aggregated histogram of I.

For instance, selection of $\omega(I)$ non-linearly depending on the aggregated histogram of I (depicted on FIG. 7) results in amplification contrast for values I more frequently appearing in the input signal.

The device 100 may also estimate S (that is the sum of weights in Eq. (5)) as follows:

$$S = \omega_0(I_t^{x,y}, \varepsilon_t) + \sum_{i=-k}^{-1} \omega_i(I_{t+i}^{x,y}, \varepsilon_{t+i}) + \sum_{j=1}^{l} \omega_j(I_{t+j}^{x,y}, \varepsilon_{t+j}) \qquad \text{Eq. (12)}$$

The estimated S may play the role of an amplification factor. For example, S<1 leads to overall brightness reduction (a typical use case may be in "high-light captured images" and S<1 may help to avoid overflow and thus the oversaturation). Further, S>1 may lead to overall brightness increment (a typical use case may be in "low-light captured images"). A desirable diapason of LightAccumulation (the output of Eq. (4)) may be C (D=Max (LightAccumulation)−Min(LightAccumulation)). Then, the Eq. (12) for S may ensure diapason D, as follow:

$$S = \frac{D}{\text{mean}(I_t^{x,y}) + \sum_{i=-k}^{-1} \text{mean}(I_{t+i}^{x,y}) + \sum_{j=1}^{l} \text{mean}(I_{t+j}^{x,y})}. \qquad \text{Eq. (13)}$$

Figure 8:
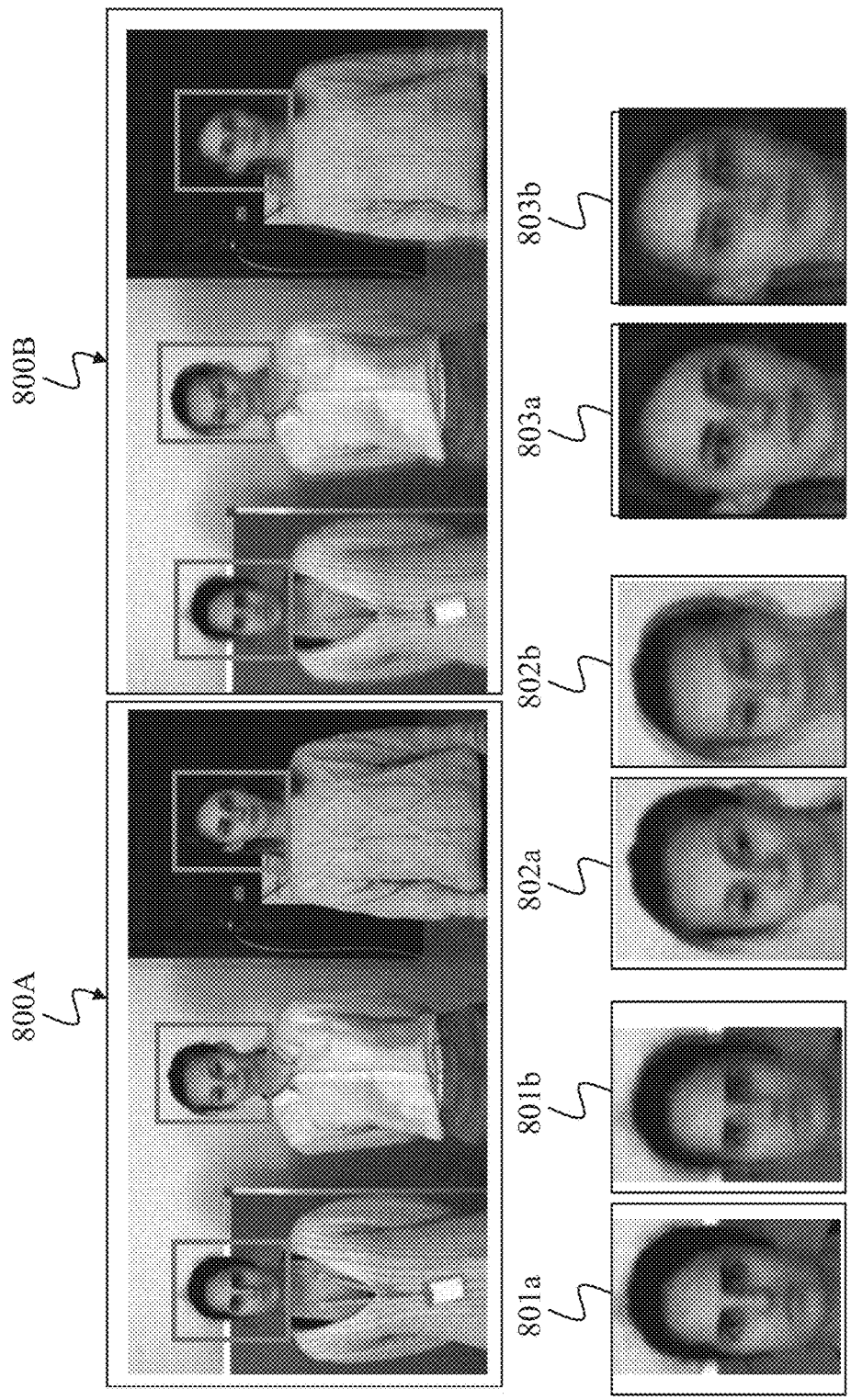
FIG. 8 shows generating output images based on performing a light accumulation with motion estimation and without motion estimation.

FIG. 8 shows generating output images based on performing a light accumulation with motion estimation and without motion estimation.

In FIG. 8, the device 100 generated the output image 800A based on performing a light accumulation procedure with (considering the) motion estimation. Moreover, the device 100 generated the output image 800B based on performing a light accumulation procedure without considering the motion estimation.

Furthermore, 801a, 802a and 803a show objects in the generated output image 800A and 801b, 802b, and 803b show the respective objects in the generated output image 800B. As it can be derived, the device 100 increases the perceptual quality of images in the video sequence.

Figure 9:
FIG. 9 shows an exemplarily obtained image data and the generated output image based on the motion aware light accumulation procedure.

FIG. 9 shows an exemplarily obtained image data 902 and the generated output image 922 based on the motion aware light accumulation.

Figure 10:
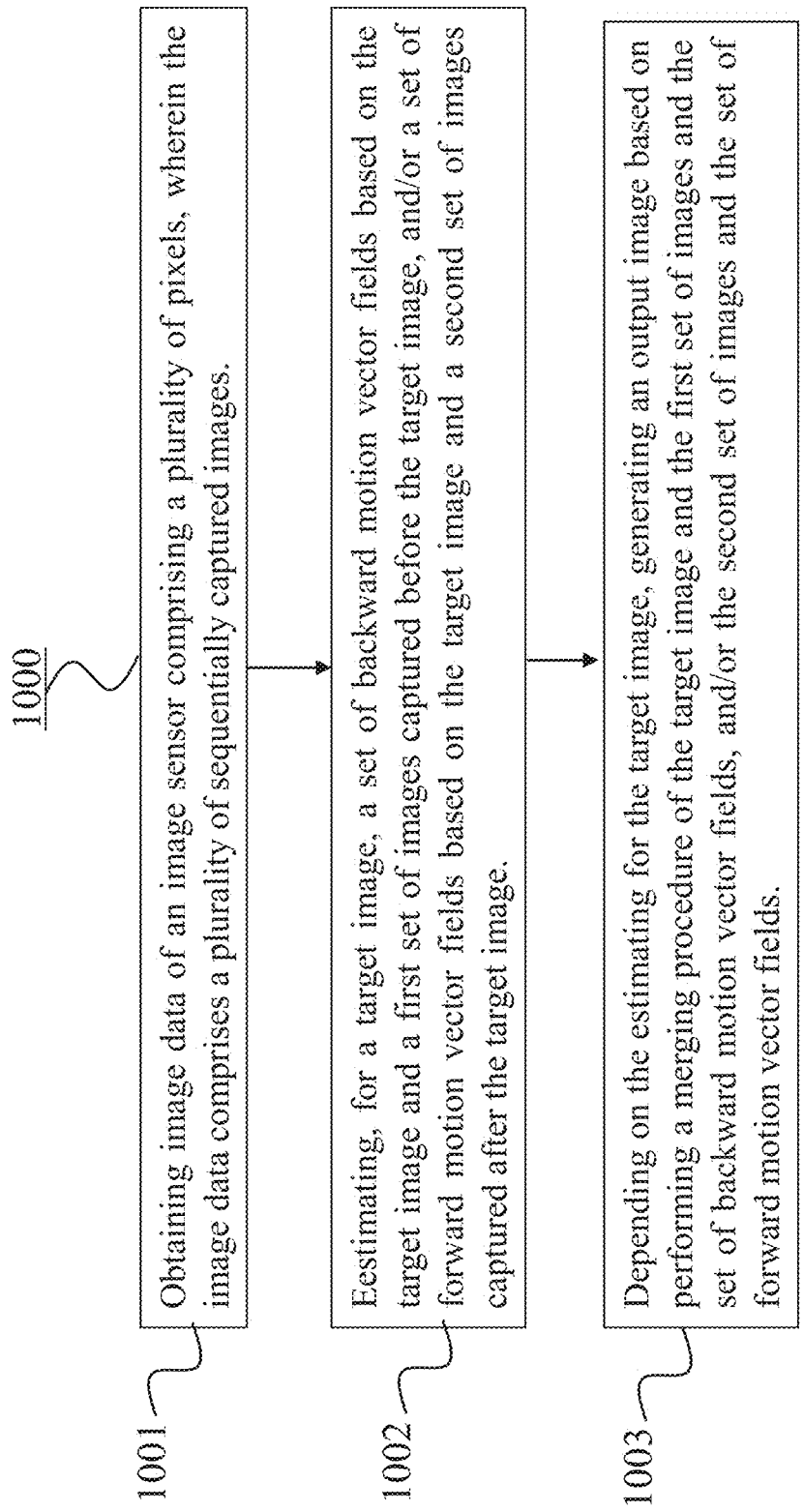
FIG. 10 shows a flowchart of a method for digital signal processing, according to an embodiment of the invention.

FIG. 10 shows a method 1000 according to an embodiment of the invention for digital signal processing. The method 1000 may be carried out by the device 100, as it is described above.

The method 1000 comprises a step 1001 of obtaining 1001 image data 102, of an image sensor 101 comprising a plurality of pixels, wherein the image data 102 comprises a plurality of sequentially captured images 111, 112, 113.

The method 1000 further comprises a step 1002 of estimating, for a target image 112, a set of backward MVFs 121 based on the target image 112 and a first set of images 111 captured before the target image 112, and/or a set of forward MVFs 123 based on the target image 112 and a second set of images 113 captured after the target image 112.

The method 1000 further comprises a step 1003 of, depending on the estimating for the target image 112, generating an output image 122 based on performing a merging procedure of the target image 112 and the first set of images 111 and the set of backward MVFs 121, and/or the second set of images 113 and the set of forward MVFs 123.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for digital signal processing, the device comprising:
   a memory configured to store instructions; and
   one or more processors coupled to the memory and configured to execute the instructions to cause the device to:
   obtain image data, of an image sensor comprising a plurality of pixels, wherein the image data comprises a plurality of sequentially captured images,
   estimate, for a target image,
      a set of backward motion vector fields based on the target image and a first set of images captured before the target image, and/or
      a set of forward motion vector fields based on the target image and a second set of images captured after the target image, and
   depending on the estimating for the target image, generate an output image based on performing a merging procedure of the target image and
      the first set of images and the set of backward motion vector fields, and/or
      the second set of images and the set of forward motion vector fields.

2. The device according to claim 1, wherein for performing the merging procedure, the one or more processors are further configured to execute the instructions to cause the device to:
   depending on the estimating for the target image,
      estimate a set of backward warped images based on a first warping of the first set of images and the set of backward motion vector fields, and/or
      estimate a set of forward warped images based on a second warping of the second set of images and the set of forward motion vector fields; and
   depending on the estimating for the target image, generate the output image by combining the target image with the set of backward warped images and/or the set of forward warped images.

3. The device according to claim 1, wherein the one or more processors are further configured to execute the instructions to cause the device to:
   apply a filtration process to the output image generated by the merging procedure.

4. The device according to claim 1, wherein the estimating the set of backward motion vector fields comprises:
   estimating a motion of an object, motion of the image sensor and/or a motion shift in an image obtained after an Image Signal Processing (ISP) pipeline, between the target image and the first set of images.

5. The device according to claim 1, wherein the estimating the set of forward motion vector fields comprises:
   estimating a motion of an object, a motion of the image sensor and/or a motion shift in an image obtained after an Image Signal Processing (ISP) pipeline, between the target image and the second set of images.

6. The device according to claim 1, wherein:
each backward motion vector field of the set of backward motion vector fields is estimated based on exactly one image of the first set of images, and/or
each forward motion vector field of the set of forward motion vector fields is estimated based on exactly one image of the second set of images.

7. The device according to claim 6, wherein:
the exactly one image of the first set of images is different for each of the backward motion vector fields, and/or
the exactly one image of the second set of images is different for each of the forward motion vector fields.

8. The device according to claim 1, wherein the one or more processors are further configured to execute the instructions to cause the device to:
select at least one pixel in the target image and its corresponding pixels in the first set of images and/or the second set of images, and
determine a motion shift between the at least one pixel and at least one selected corresponding pixel, for estimating the set of backward motion vector fields and/or the set of forward motion vector fields.

9. The device according to claim 8, wherein the determining the motion shift comprises:
determining one or more motion trajectories for one or more coordinates, and
performing a non-linear transformation on the determined one or more motion trajectories for reducing noise intensity and/or adjusting contrast.

10. The device according to claim 1, wherein:
the merging procedure is adapted to be performed pixelwise.

11. The device according to claim 10, wherein:
the pixelwise merging procedure further comprises a weighted or unweighted addition of intensity values of the target image and intensity values of the first set of images and/or the second set of images.

12. The device according to claim 1, wherein:
the obtained image data and the generated output image are based on a Bayer array, YUV color spacer, or RGB color spacer.

13. The device according to claim 12, wherein:
the merging procedure is performed separately on each color component.

14. A method for digital signal processing applied to a device for the digital signal processing comprising one or more processors, the method comprising:
obtaining image data, of an image sensor comprising a plurality of pixels, wherein the image data comprises a plurality of sequentially captured images,
estimating, for a target image,
a set of backward motion vector fields based on the target image and a first set of images captured before the target image, and/or
a set of forward motion vector fields based on the target image and a second set of images captured after the target image, and
depending on the estimating for the target image, generating an output image based on performing a merging procedure of the target image and
the first set of images and the set of backward motion vector fields, and/or
the second set of images and the set of forward motion vector fields.

15. The method according to claim 14, wherein for performing the merging procedure, the method further comprises:
depending on the estimating for the target image,
estimating a set of backward warped images based on a first warping of the first set of images and the set of backward motion vector fields, and/or
estimating a set of forward warped images based on a second warping of the second set of images and the set of forward motion vector fields; and
depending on the estimating for the target image, generating the output image by combining the target image with the set of backward warped images and/or the set of forward warped images.

16. The method according to claim 14, further comprising:
applying a filtration process to the output image generated by the merging procedure.

17. The method according to claim 14, wherein the estimating the set of backward motion vector fields comprises:
estimating a motion of an object, a motion of the image sensor and/or a motion shift in an image obtained after an Image Signal Processing (ISP) pipeline, between the target image and the first set of images.

18. A non-transitory computer-readable medium comprising a program which, when executed by a computer, causes the computer to perform operations including:
obtaining image data, of an image sensor comprising a plurality of pixels, wherein the image data comprises a plurality of sequentially captured images,
estimating, for a target image,
a set of backward motion vector fields based on the target image and a first set of images captured before the target image, and/or
a set of forward motion vector fields based on the target image and a second set of images captured after the target image, and
depending on the estimating for the target image, generating an output image based on performing a merging procedure of the target image and
the first set of images and the set of backward motion vector fields, and/or
the second set of images and the set of forward motion vector fields.

19. The non-transitory computer-readable medium according to claim 18, wherein for performing the merging procedure, the operations further include:
depending on the estimating for the target image,
estimating a set of backward warped images based on a first warping of the first set of images and the set of backward motion vector fields, and/or
estimating a set of forward warped images based on a second warping of the second set of images and the set of forward motion vector fields; and
depending on the estimating for the target image, generating the output image by combining the target image with the set of backward warped images and/or the set of forward warped images.

20. The non-transitory computer-readable medium according to claim 18, wherein the operations further include:
applying a filtration process to the output image generated by the merging procedure.

* * * * *

UNITED STATES PATENT AND TRADEMARK OFFICE
CERTIFICATE OF CORRECTION

| | |
|---|---|
| PATENT NO. | : 12,266,118 B2 |
| APPLICATION NO. | : 17/879592 |
| DATED | : April 1, 2025 |
| INVENTOR(S) | : Ustiuzhanin et al. |

Page 1 of 1

It is certified that error appears in the above-identified patent and that said Letters Patent is hereby corrected as shown below:

In the Claims

Claim 4: Column 14, Line 58: "estimating a motion of an object, motion of the image" should read as -- estimating a motion of an object, a motion of the image --.

Signed and Sealed this
Twenty-second Day of July, 2025

Coke Morgan Stewart
*Acting Director of the United States Patent and Trademark Office*